US012003606B2

(12) United States Patent
Gould et al.

(10) Patent No.: US 12,003,606 B2
(45) Date of Patent: *Jun. 4, 2024

(54) SYSTEMS AND METHODS FOR PROVIDING SECURE ACCESS TO SHARED REGISTRATION SYSTEMS

(71) Applicant: VERISIGN, INC., Reston, VA (US)

(72) Inventors: James F. Gould, Leesburg, VA (US); Scott Hollenbeck, Fairfax Station, VA (US); Patrick Kane, Ashburn, VA (US); Joseph Waldron, Herndon, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/549,223

(22) Filed: Dec. 13, 2021

(65) Prior Publication Data

US 2022/0103654 A1    Mar. 31, 2022

Related U.S. Application Data (63) Continuation of application No. 16/746,483, filed on Jan. 17, 2020, now Pat. No. 11,265,397, which is a
(Continued)

(51) Int. Cl.
*H04L 67/63* (2022.01)
*H04L 9/40* (2022.01)
(Continued)

(52) U.S. Cl.
CPC ............ *H04L 67/63* (2022.05); *H04L 61/302* (2013.01); *H04L 63/083* (2013.01); *H04L 67/02* (2013.01); *H04W 12/08* (2013.01)

(58) Field of Classification Search
CPC ....... H04L 67/02; H04L 67/63; H04L 61/302; H04L 63/083; H04W 12/08
(Continued)

(56) References Cited

U.S. PATENT DOCUMENTS 6,052,733 A    4/2000  Mahalingam et al.
6,119,234 A    9/2000  Aziz et al.
(Continued)

FOREIGN PATENT DOCUMENTS

WO    2012091974 A1    7/2012

OTHER PUBLICATIONS

Alfred J. Menezes et al., Handbook of Applied Cryptography, 1997, 1.6 Digital Signatures, pp. 22-23 (6 pages).
(Continued)

*Primary Examiner* — Wing F Chan
*Assistant Examiner* — Leon Y Tseng
(74) *Attorney, Agent, or Firm* — McCarter & English, LLP; Michael A. Sartori (57) ABSTRACT

Embodiments relate to systems, devices, and computer-implemented methods for providing secure access to a shared registration system of a domain name registry by generating authorization information associated with a domain name, storing the authorization information in an archive, receiving, from a non-registrar service provider, a request for access to functionality of a shared registration system of the domain name registry, where the request is associated with the domain name and includes authorization information, determining whether the received authorization information is valid using the archived authorization information, and allowing the non-registrar service provider access to the functionality of the SRS based on a determination that the second authorization information is valid.

20 Claims, 5 Drawing Sheets

Related U.S. Application Data continuation of application No. 14/844,703, filed on Sep. 3, 2015, now Pat. No. 10,542,117.

(51) Int. Cl.
  *H04L 61/3015* (2022.01)
  *H04L 67/02* (2022.01)
  *H04W 12/08* (2021.01)
(58) Field of Classification Search
  USPC ......................................................... 709/229
  See application file for complete search history.

(56) References Cited

U.S. PATENT DOCUMENTS

| | | |
|---|---|---|
| 6,961,783 B1 | 11/2005 | Cook et al. |
| 7,644,117 B2 | 1/2010 | Zimmerman et al. |
| 7,987,251 B2 | 7/2011 | Blinn et al. |
| 7,996,457 B2 | 8/2011 | Parsons et al. |
| 8,073,783 B2 | 12/2011 | Felsted et al. |
| 8,402,508 B2 | 3/2013 | Rouskov et al. |
| 8,571,990 B2 | 10/2013 | Buss |
| 8,745,718 B1 | 6/2014 | Dufel et al. |
| 8,904,519 B2 | 12/2014 | Essawi et al. |
| 8,949,982 B2 | 2/2015 | Gould et al. |
| 9,106,712 B1 | 8/2015 | Gardos et al. |
| 9,130,926 B2 | 9/2015 | Nori et al. |
| 9,137,094 B1 | 9/2015 | Sayed et al. |
| 9,485,213 B2 | 11/2016 | Schilling |
| 9,684,918 B2 | 6/2017 | Kamdar |
| 9,807,053 B1 | 10/2017 | Schilling et al. |
| 10,015,134 B2 | 7/2018 | Gould et al. |
| 10,476,836 B1 | 11/2019 | Saleem et al. |
| 2002/0059146 A1 | 5/2002 | Keech |
| 2002/0152400 A1 | 10/2002 | Zhang et al. |
| 2003/0140223 A1 | 7/2003 | Desideri |
| 2004/0167982 A1 | 8/2004 | Cohen et al. |
| 2004/0249961 A1 | 12/2004 | Katsube et al. |
| 2005/0021965 A1 | 1/2005 | Van Horn |
| 2005/0102354 A1 | 5/2005 | Hollenbeck et al. |
| 2006/0031330 A1 | 2/2006 | Ruiz |
| 2007/0208869 A1 | 9/2007 | Adelman et al. |
| 2009/0300355 A1 | 12/2009 | Crane et al. |
| 2010/0049790 A1 | 2/2010 | Schreiber |
| 2010/0325723 A1 | 12/2010 | Essawi et al. |
| 2011/0225637 A1 | 9/2011 | Counterman |
| 2011/0276485 A1 | 11/2011 | Varga |
| 2012/0136936 A1 | 5/2012 | Quintuna |
| 2012/0174198 A1 | 7/2012 | Gould et al. |
| 2012/0260322 A1 | 10/2012 | Logan et al. |
| 2012/0314856 A1 | 12/2012 | Zaverucha et al. |
| 2013/0080341 A1 | 3/2013 | Veeramachaneni et al. |
| 2013/0104202 A1 | 4/2013 | Yin et al. |
| 2013/0191884 A1 | 7/2013 | Leicher et al. |
| 2014/0013396 A1 | 1/2014 | Field-Eliot et al. |
| 2014/0075513 A1 | 3/2014 | Trammel et al. |
| 2014/0189834 A1 | 7/2014 | Metke et al. |
| 2014/0337914 A1 | 11/2014 | Canning et al. |
| 2015/0058960 A1 | 2/2015 | Schmoyer et al. |
| 2015/0295905 A1 | 10/2015 | Leicher et al. |
| 2015/0295916 A1 | 10/2015 | Sanso et al. |
| 2015/0312257 A1 | 10/2015 | Antipa et al. |
| 2016/0057100 A1 | 2/2016 | Blinn et al. |
| 2016/0134599 A1 | 5/2016 | Ross et al. |
| 2016/0269396 A1 | 9/2016 | Ren et al. |
| 2017/0006021 A1 | 1/2017 | Karaatanassov et al. |
| 2017/0070595 A1 | 3/2017 | Gould et al. |
| 2017/0187673 A1 | 6/2017 | Kaliski, Jr. et al. |
| 2017/0279617 A1 | 9/2017 | Blinn et al. |
| 2017/0279762 A1 | 9/2017 | Fregly |
| 2018/0062856 A1 | 3/2018 | Kaliski, Jr. et al. |
| 2018/0063141 A1 | 3/2018 | Kaliski, Jr. et al. |
| 2018/0351943 A1 | 12/2018 | Yasukawa et al. |
| 2020/0153938 A1 | 5/2020 | Gould et al. |
| 2021/0234696 A1 | 7/2021 | Kaliski, Jr. et al. |

OTHER PUBLICATIONS

Office Action issued in U.S. Appl. No. 15/251,716 dated Jun. 16, 2021, 34 pages.
Office Action issued in U.S. Appl. No. 15/251,497 dated Feb. 11, 2021, 19 pages.
Office Action issued in U.S. Appl. No. 15/251,497, dated Mar. 27, 2019, 19 pages.
Office Action issued in U.S. Appl. No. 15/251,497 dated Nov. 21, 2018, 24 pages.
Office Action issued in U.S. Appl. No. 15/251,716 dated Dec. 18, 2020, 20 pages.
Office Action issued in U.S. Appl. No. 15/251,716 dated Oct. 16, 2018, 28 pages.
Office Action issued in U.S. Appl. No. 15/251,716 dated Nov. 4, 2019, 18 pages.
Office Action issued in U.S. Appl. No. 15/251,497 dated Mar. 10, 2020, 19 pages.
Office Action issued in U.S. Appl. No. 15/251,497 dated Sep. 25, 2020, 23 pages.
Office Action issued in U.S. Appl. No. 15/251,716 dated Apr. 29, 2020, 24 pages.
Bruce Schneier, Applied Cryptography, Protocols, Algorithms, and Source Code in C, Aug. 12, 1996, Public-Key Key Management, pp. 185-187 (6 pages).
dnsmadeeasy.com, Authoritative vs Recursive DNS Servers What's the Difference?, Jul. 17, 2013, http:/social.dnsmadeeasy.com/blog/authoritative-vs-recursive-dns-servers-whats-thedifference/[3/12/2019], 3 pages.
Fisher, S., A Beginner's Guide to Domain Name Management, Feb. 18, 2014, https://blog.hubspot.com/insiders/domain-name-management[9/26/2018], 9 pages.
Google, About registrars and registries, Google Domains Help, Sep. 14, 2015, https://web.archive.org/web/20150914225714/https://support.google.com/domains/answer/3251189?hl=en[3/12/2019], 1 page.
Office Action issued in U.S. Appl. No. 14/980,158 dated Mar. 19, 2019, 47 pages.
Office Action issued in U.S. Appl. No. 14/980,158 dated Apr. 2, 2020, 42 pages.
Office Action issued in U.S. Appl. No. 14/980,158 dated Oct. 4, 2018, 57 pages.
Notice of Allowance issued in U.S. Appl. No. 14/980,158 dated May 5, 2021, 20 pages.
Notice of Allowance issued in U.S. Appl. No. 14/980,158 dated Aug. 12, 2020, 39 pages.
Notice of Allowance issued in U.S. Appl. No. 14/980,158 dated Nov. 19, 2020, 16 pages.
Notice of Allowance issued in U.S. Appl. No. 14/980,158 dated Jun. 30, 2020, 52 pages.
Hardaker, W., "Child-to-Parent Synchronization in DNS", Internet Engineering Task Force (IETF), Request for Comments: 7477, dated Mar. 2015 (located at https://tools.ietf.org/html/rfc7477), 16 pages.
Applied Innovations, How to Manage DNS through your Domain Registrar, Mar. 2015, https://support.appliedi.net/kb/a216/how-to-manage-dns-through-your-domain-registrar.aspx[9/26/2018], 2 pages.
Office Action issued in European Application No. 16186666.0, dated Apr. 9, 2019, 5 pages.
Kumari et al., "Automating DNSSEC Delegation Trust Maintenance", Internet Engineering Task Force IETF), Request for comments: 7344, dated Sep. 2014 (located at https://tools.ieft.org/html/rfc3744), 19 pages.
Mr. DNS, What is TLD Name Server?, Aug. 17, 2009, http://www.dnsknowledge.com/whatis/tld-name-server/[3/12/2019], 4 pages.
Nat, Dummy's Guide for the Difference between Oauth Authentication and OpenID , May 15, 2011, https://nat.sakimura.org/2011/05/15/dummys-guide-for-the-difference-between-oauth-authentication-and-openid/[9/25/2018], 10 pages.
Information Security Stack Exchange, OAuth 2 vs OpenID Connect to secure API, Jul. 2015, https://security.stackexchange.com/questions/94995/oauth-2-vs-openid-connect-to-secure-api[9/25/2018], 5 pages.

(56) References Cited

OTHER PUBLICATIONS

Office Action issued in European Patent Application No. 16206770.6 dated Jan. 28, 2019, pp. 1-5.
Office Action issued in U.S. Appl. No. 14/844,703 dated Nov. 16, 2017, pp. 1-49.
Corrected Notice of Allowability issued in U.S. Appl. No. 14/844,703 dated Dec. 16, 2019, 15 pages.
Corrected Notice of Allowability issued in U.S. Appl. No. 14/844,703 dated Sep. 27, 2019, 14 pages.
Office Action issued in U.S. Appl. No. 14/844,703 dated Apr. 5, 2019, 25 pages.
Office Action issued in U.S. Appl. No. 14/844,703 dated May 24, 2018, 34 pages.
Office Action issued in U.S. Appl. No. 14/844,703 dated Nov. 5, 2018, 19 pages.
Notice of Allowance issued in U.S. Appl. No. 14/844,703 dated Sep. 10, 2019, 15 pages.
Notice of Allowance issued in U.S. Appl. No. 14/980,158 dated Aug. 17, 2021, 14 pages.
Office Action issued in U.S. Appl. No. 16/746,483 dated Mar. 16, 2021, 21 pages.
Notice of Allowance issued in U.S. Appl. No. 16/746,483 dated Jun. 8, 2021, 12 pages.
Notice of Allowance issued in U.S. Appl. No. 16/746,483 dated Aug. 16, 2021, 19 pages.
Office Action issued in U.S. Appl. No. 17/227,660 dated Sep. 20, 2021, 78 pages.
OAuth Core 1.0, https://oauth.net/core/1.0/, Dec. 4, 2007 [retrieved on Sep. 15, 2021], 14 pages.
Office Action issued in U.S. Appl. No. 15/251,497 dated Oct. 5, 2021, 33 pages.
Notice of Allowance issued in U.S. Appl. No. 16/746,483 dated Nov. 22, 2021, 12 pages.
Office Action issued in U.S. Appl. No. 15/251,497 dated Sep. 6, 2019, pp. 1-21.
Office Action issued in U.S. Appl. No. 14/980,158 dated Nov. 1, 2019, pp. 1-18.
Hunt, M., "System for Managing a Shared Domain Registry", draft-nzrs-srs-02, Network Working Group, New Zealand Registry Services, Jul. 26, 2010, pp. 1-162.
Icann, Unsponsored TLD Agreement—Appendix C (.pro), dated Sep. 30, 2004; retrieved from https://www.icann.org/resources/unthemed-pages/registry-agmt-appc-2004-09-30-en (20 pages).
Office Action issued in U.S. Appl. No. 15/251,497 dated Apr. 2, 2018, pp. 1-50.
Office Action issued in U.S. Appl. No. 15/251,716 dated Mar. 22, 2018, pp. 1-47.
Extended European Search Report dated Dec. 15, 2017, European Application No. 17188586.6, pp. 1-8.
Extended European Search Report dated Dec. 15, 2017, European Application No. 17188591.6, pp. 1-8.
Extended European Search Report dated May 4, 2017, European Application No. 16206770.6, pp. 1-6.
Hunt, M., "Systems for Managing a Shared Domain Registry", Sep. 29, 2010, Retrieved from the Internet on Jan. 23, 2017: https://docs.nzrs.net.nz/_downloads/draft-nzrs-srs-03.pdf, pp. 1-169.
Extended European Search Report dated Jan. 31, 2017, European Application No. 16186666.0, pp. 1-8.
Mark Jeftovic, "Nameserver Operators Need the Ability to "Disavow" Domains", CircleID Internet Infrastructure, Dec. 2, 2014, Retrieved from the Internet: http:l/www.circleid.com/posts/20141202_nameserver_operators_need_the_ability_to_disavow_domains/, pp. 1-5.
Godaddy, "Cashparking", Retrieved from the internet on Feb. 19, 2016: https://www.godaddy.com/domains/cashparking, pp. 1-5.
Certified-Domains, "The Internet Hotspot for Domains, Email, Web Hosting, Certified Domains, and More", Retrieved from the Internet on Feb. 19, 2016: http://www_certified-domains.com/Certified-Domains_html, p. 1.

SYSTEMS AND METHODS FOR PROVIDING SECURE ACCESS TO SHARED REGISTRATION SYSTEMS

RELATED APPLICATION

The present application claims priority to, and the benefit of, U.S. patent application Ser. No. 16/746,483 entitled, "SYSTEMS AND METHODS FOR PROVIDING SECURE ACCESS TO SHARED REGISTRATION SYSTEMS" filed on Jan. 17, 2020, which claims priority to, and the benefit of, U.S. Pat. No. 10,542,117 entitled, "SYSTEMS AND METHODS FOR PROVIDING SECURE ACCESS TO SHARED REGISTRATION SYSTEMS" filed on Sep. 3, 2015, the contents of which are hereby incorporated by reference in their entireties.

BACKGROUND

The Domain Name System ("DNS") is the part of the Internet infrastructure that translates human-readable domain names into the Internet Protocol ("IP") numbers needed to establish TCP/IP communication over the Internet. DNS allows users to refer to web sites, and other resources, using easier to remember domain names, such as "www.example.com", rather than the numeric IP addresses associated with a website, e.g., 192.0.2.1, and assigned to computers on the Internet. Each domain name can be made up of a series of character strings (e.g., labels) separated by dots. The right-most label in a domain name is known as the top-level domain ("TLD"). Examples of well-known TLDs are .COM; .NET; .ORG; and the like.

Domain name registries generally maintain authoritative lists of TLDs and publish DNS TLD zones that are used to resolve domain name queries. Some registries sell domain reservations in TLDs "wholesale" to domain name registrars or some domain name registrars can be vertically integrated with a registry. Registries generally also provide DNS management functions to registrars. Registrars provide retail domain name registration and DNS management services to registrants, and may also provide domain services such as web hosting and DNS resolution service for registered domains.

DNS management functions provided by registries can include access to a Shared Registration System (SRS). An SRS can provide TLD management functions to registrars that are authorized, accredited, and/or vertically integrated with the registry. For example, Verisign, Inc. operates an SRS that limits access for TLD management functions to registrars that have been accredited by the Internet Corporation for Assigned Names and Numbers (ICANN).

Generally, non-registrar service providers that are part of the DNS do not have access to the SRS. Accordingly, all changes to DNS service information at the registry level must be passed from the service provider to the registrar (e.g. directly or through the registrant) and from the registrar to the registry before the change can be implemented. Such a system of information exchange introduces latency, inefficiency, data loss risks, and security risks. For example, if any entity in the chain is disinterested, unresponsive, or incapable of providing a particular service, the service cannot be provided.

Accordingly, it is desirable to develop methods, systems, and computer readable media for providing secure access to shared registration systems to non-registrar service providers.

SUMMARY

The present disclosure relates to systems, devices, and methods for providing secure access to shared registration systems.

Implementations of the present teachings relate to methods, systems, and computer-readable storage media for providing secure access to a shared registration system of a domain name registry by generating authorization information associated with a domain name, storing the authorization information in an archive, receiving, from a non-registrar service provider, a request for access to functionality of a shared registration system of the domain name registry, where the request is associated with the domain name and includes authorization information, determining whether the received authorization information is valid using the archived authorization information, and allowing the non-registrar service provider access to the functionality of the SRS based on a determination that the second authorization information is valid.

In some embodiments, the domain name registry can further determine a level of access associated with the domain name that is allowed by a domain name registrar and/or a registrant associated with the domain name. The domain name registry can further determine whether to allow the non-registrar service provider access to the SRS based on the level of access.

In some implementations, the domain name registry can request confirmation of sponsorship of the non-registrar service provider from a domain name registrar. In such implementations, the domain name registry can further determine whether to allow the non-registrar service provider access to the SRS based on whether the sponsorship is confirmed.

In some implementations, the domain name registry can provide a web service that uses the principles of Representational State Transfer (REST), and the domain name registry can receive the request for access via the web service.

In some embodiments, functionalities of the SRS that the non-registrar service provider can be allowed to access can include publication of a Name Server record, an Address record, a Delegation Signer record, a Canonical Name record, and/or a Mail Exchange record.

In further embodiments, the domain name registry can transmit a notification to a domain name registrar in response to allowing the non-registrar service provider access, and the notification can include an indication of a functionality of the SRS used by the non-registrar service provider and an identifier of the non-registrar service provider.

In additional or alternative embodiments, the domain name registry can store an indication of a functionality of the SRS used by the non-registrar service provider and an identifier of the non-registrar service provider in response to allowing the non-registrar service provider access.

According to various embodiments, a computer-implemented method is presented. The computer implemented method includes receiving, at a domain name registry, a request for access to a shared registration system (SRS) of the domain name registry, where the request originates from a non-registrar service provider, where the request includes an authorization information; determining whether the authorization information is valid based on the authorization information and an electronically stored authorization information associated with a domain name; and allowing the non-registrar service provider access to a subset of domain management functions of the SRS based on a determination that the authorization information is valid.

Various optional features of the above embodiments include the following. The subset of domain management functions may include at least of one of: create, renew, transfer, delete, or update domain data. The subset of domain management functions may exclude at least one of: create, renew, transfer, delete, or update domain data. The subset of domain management functions may include domain management functions on at least one of: Name Server (NS) records, Address (A, AAAA) records, Delegation Signer (DS) records, Canonical Name (CNAME) records, or Mail Exchange (MX) records. The subset of domain management functions may exclude domain management functions on at least one of: Name Server (NS) records, Address A, AAAA) records, Delegation Signer (DS) records, Canonical Name (CNAME) records, or Mail Exchange (MX) records. The subset of domain management functions may include functions specified by at least one of a registrar for the domain name or the domain name registry. The subset of domain management functions may include at least one of: a check query function, an information query function, or a transfer query function. The subset of domain management functions may include at least one domain management function for performing at least one non-registry and non-registrar service. The subset of domain management functions may include at least one domain management function for providing at least one of: a website hosting service, a Domain Name Service (DNS) hosting service, a DNSSEC service, or a Distributed Denial of Service (DDoS) mitigation service. The method may further include: generating a random key; and transmitting the random key to a registrar, where the electronically stored authorization information includes the random key. The determining whether the authorization information is valid may include comparing the authorization information with the electronically stored authorization information.

According to various embodiments, a computer server system is presented. The computer system includes a processing system of a device including one or more processors; and a memory system including one or more computer-readable media, where the one or more computer-readable media contain instructions that, when executed by the processing system, cause the processing system to perform operations including: receiving, at a domain name registry, a request for access to a shared registration system (SRS) of the domain name registry, where the request originates from a non-registrar service provider, where the request includes an authorization information; determining whether the authorization information is valid based on the authorization information and an electronically stored authorization information associated with a domain name; and allowing the non-registrar service provider access to a subset of domain management functions of the SRS based on a determination that the authorization information is valid.

Various optional features of the above embodiments include the following. The subset of domain management functions may include at least of one of: create, renew, transfer, delete, or update domain data. The subset of domain management functions may exclude at least one of: create, renew, transfer, delete, or update domain data. The subset of domain management functions may include domain management functions on at least one of: Name Server (NS) records, Address (A, AAAA) records, Delegation Signer (DS) records, Canonical Name (CNAME) records, or Mail Exchange (MX) records. The subset of domain management functions may exclude domain management functions on at least one of: Name Server (NS) records, Address A, AAAA) records, Delegation Signer (DS) records, Canonical Name (CNAME) records, or Mail Exchange (MX) records. The subset of domain management functions may include functions specified by at least one of a registrar for the domain name or the domain name registry. The subset of domain management functions may include at least one of: a check query function, an information query function, or a transfer query function. The subset of domain management functions may include at least one domain management function for performing at least one non-registry and non-registrar service. The subset of domain management functions may include at least one domain management function for providing at least one of: a website hosting service, a Domain Name Service (DNS) hosting service, a DNSSEC service, or a Distributed Denial of Service (DDoS) mitigation service. The operations further include: generating a random key; and transmitting the random key to a registrar, where the electronically stored authorization information includes the random key. The whether the authorization information is valid may include comparing the authorization information with the electronically stored authorization information.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Figure 1:
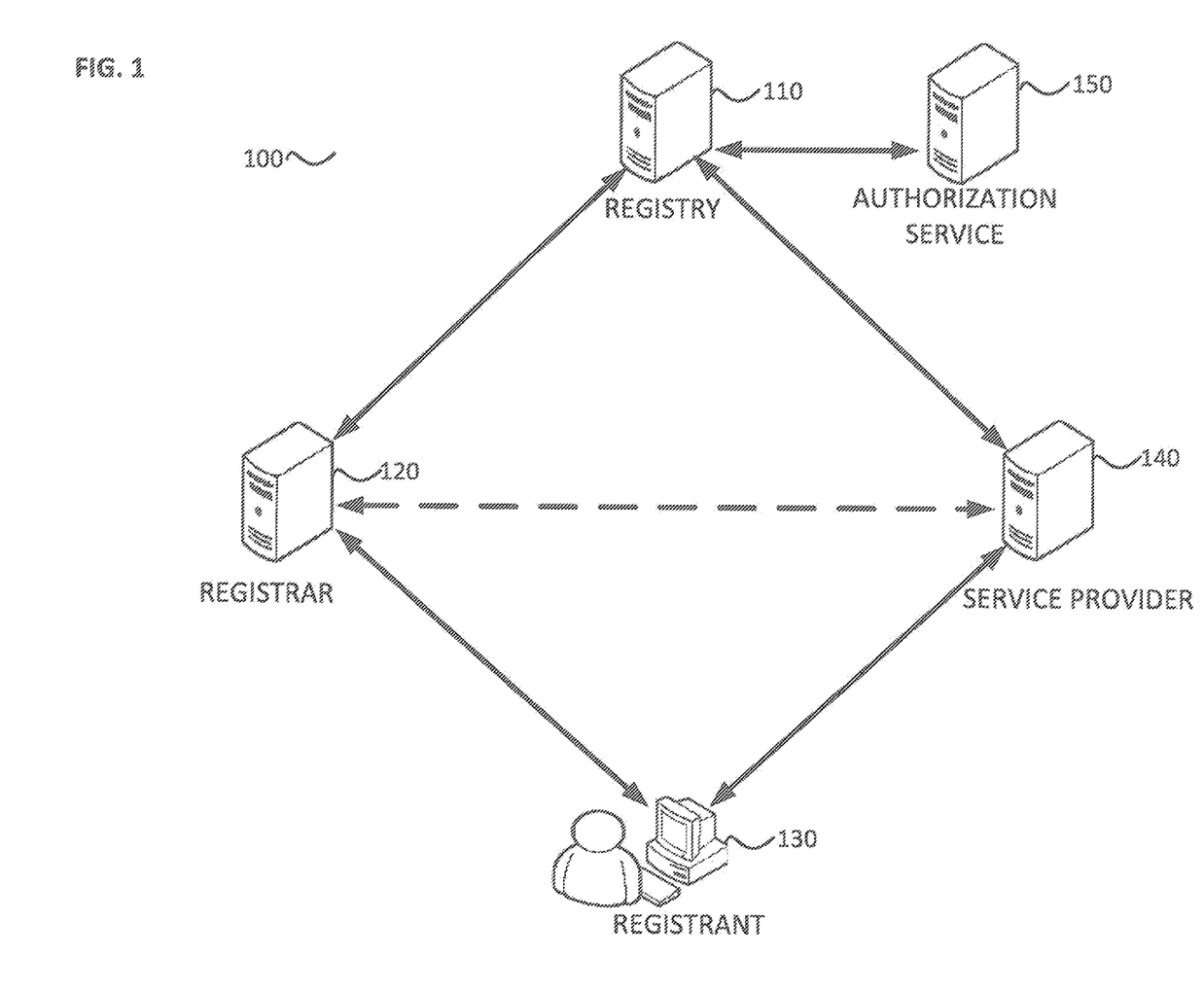
FIG. 1 is a diagram depicting an example of a DNS schematic, consistent with certain disclosed embodiments.

FIG. 1 is a diagram depicting an example of a Domain Name System (DNS) schematic, consistent with certain disclosed embodiments. In particular, FIG. 1 depicts a domain name system 100 that includes a registry 110, a registrar 120, a registrant 130, a non-registrar service provider 140, and an authorization service 150.

In some embodiments, registry 110 can be a domain name registry that maintains an authoritative list of TLDs and publishes DNS TLD zones that are used to resolve domain name queries. Registry 110 can also sell domain reservations in TLDs "wholesale" to domain name registrars, such as, for example registrar 120 or registry 110 can be can be vertically integrated with registrars, such as, for example, registrar 120. Registry 110 can also provide management functions to registrars via an SRS operated by registry 110. In some embodiments, an SRS can provide functions to registrars that include, but are not limited to: creating, deleting, renewing, transferring, and updating domain data. For example, domain data can include records such as DNS Name Server (NS) records, Address (A, AAAA) records, Delegation Signer (DS) records, Canonical Name (CNAME) records, and Mail Exchange (MX) records. In further embodiments, an SRS can also provide query functions to registrars that include, but are not limited to: check, information, and transfer queries. In some implementations, the check query can be used to determine the availability of an object (e.g., a domain name, a host name, or contact information), the information query can be used to retrieve information associated with an object, and the transfer query can be used to obtain transfer information for a pending or a previous transfer request.

In some implementations, registry 110 can limit access to the SRS. For example, registry 110 may limit access to registrars that have been accredited by registry 110, accredited by ICANN, and/or have completed a series of tests in the registries Operational Test & Evaluation (OT&E) environment. In some implementations, registry 110 may also provide access to non-registrar service providers (e.g. non-registrar service provider 140) that send valid requests, are authorized by a sponsoring registrar or registrant, and provide proper authorization information, as discussed further below.

In further embodiments, registry 110 can provide services beyond maintaining an authoritative list of TLDs, publishing DNS TLD zones, and selling domain reservations in TLDs "wholesale." For example, registry 110 can be a service registry that provides services such as Domain Name System Security Extensions (DNSSEC), website hosting, email forwarding, parked pages, certified domains, deleting domain services, Transport Layer Security (TLS) certificates, domain name resale, and validation services. Such services can be provided to registrar 120, non-registrar service provider 140, and/or to registrant 130 via registrar 120 or non-registrar service provider 140. In some embodiments, registry 110 may not directly provide a service but can provide functionality to support the service via the SRS. For example, a certificate authority can provide certificate services, and the SRS can enable registrars and registrants to select the certificate authority to use for certificate services by passing the certificate request information from the registrar or registrant through to the certificate authority and facilitating authorization of the certificate creation request.

In some embodiments, registrar 120 can be a domain name registrar that provides retail domain name registration and management services to registrants. Registrar 120 can, in some implementations, be accredited by registry 110 or vertically integrated with registry 110. Accordingly, in such embodiments, management services provided by registrar 120 are performed in accordance with guidelines designated by registry 110. Registrar 120 can, in further embodiments, purchase domain reservations in TLDs "wholesale" from registry 110 and sell TLDs at retail to registrants, such as, for example, registrant 130.

In additional embodiments, registrar 120 can provide domain services to registrants. Domain services can include, but are not limited to, web hosting and DNS service. For example, registrar 120 can provide registrant 130 with web hosting services by providing storage space, bandwidth, processing, databases, etc. for a website of registrant 130. Additionally, for example, registrar 120 can provide DNS services, such as a DNS hosting service, for registrant 130. DNS hosting services provided by a registrar allow for domain name resolution at DNS nodes provided by the registrar, which can, in some embodiments, allow for the operation of DNS nodes closer to end users. In some implementations, DNS resolution at nodes closer to an end user can incur less latency compared to DNS resolution at a central domain name registry.

Additional examples of a domain services that can be provided by registrar 120 include security services, such as DNSSEC services. In some embodiments, registrar 120 can provide DNSSEC services by providing an interface that allows registrants to upload the Delegation Signer (DS) DNS records, which can then be pushed by the registrar to the registry. The registry can then publish the DS to the TLD zone. Additionally, if registrar 120 provides DNS hosting services for registrant 130, registrar 120 can also publish the DS in its child domain zone for the domain of registrant 130.

Some of the services provided by registrar 120 can require access to the SRS of registry 110, such as, for example, reserving domain names, providing DNS hosting, and providing DNSSEC services. In some embodiments, registrar 120 is allowed access to the SRS because registrar 120 is accredited by registry 110, registrar 120 is accredited by ICANN, and/or registrar 120 is vertically integrated with registry 110.

In some embodiments, registrant 130 can be a retail consumer of services, such as, for example, purchasing domain name reservations, web hosting services, and DNS services. For example, registrant 130 can require the services of registry 110 and registrar 120 to reserve a domain name this is associated with a website of registrant 130.

Registrant 130 can require certain services for the website, such as, for example, web site hosting, DNS hosting, and DNSSEC. In some embodiments, such services may be provided by registrar 120. However, in other embodiments, registrar 120 may not provide all the services needed and/or desired by registrant 130. Accordingly, in such embodiments, registrant 130 may utilize non-registrar service provider 140 to provide the needed or desired services.

In some embodiments, non-registrar service provider 140 can be an entity that provides non-registry and non-registrar services. Non-registry and non-registrar services can refer to services that could be provided by a registry and/or registrar, but are not required to be performed by a registry or registrar.

For example, non-registrar service provider 140 can provide a website hosting service. As an additional example, non-registrar service provider 140 can provide DNS hosting services. As a further example, non-registrar service provider 140 can provide DNS SEC services. As a still further example, non-registrar service provider 140 can provide mitigation services for Denial of Service or Distributed Denial of Service (DDoS) attacks.

In some embodiments, non-registrar service provider 140 is not accredited by or vertically integrated with registry 110. Accordingly, non-registrar service provider 140 may not initially have access to the SRS of registry 110, and, without access to the SRS, non-registrar service provider 140 is limited in the services that can be provided. In further embodiments, non-registrar service provider 140 can be accredited by, vertically integrated with, or may represent one or more services provided by registry 110.

For example, DNSSEC can require information to be published in both the TLD zone published by the registry and the child domain zone published by a DNS hosting provider. Accordingly, if the DNS hosting provider is a registrar accredited by the registry, the registrar can pass the information to the registry to be published in the TLD zone using the SRS. However, if the DNS hosting provider is not a registrar accredited by the registry, such as, for example, non-registrar service provider 140, then the DNS hosting provider would have to go through an accredited registrar (e.g. registrar 120) to provide the service. Accordingly, if the registrar does not provide the service or if the registrar does not provide an interface for the DNS hosting provider to use, the registrant may not be able to use the DNS hosting provider for DNSSEC.

As an additional example, a DDoS attack may require delegation changes in the zone to mitigate the attack. An attacker, using spoofed source Internet Protocol (IP) addresses, can send a large number of DNS queries for a particular resource (e.g. a domain name request), causing the DNS to send a large number of potentially large query responses to an unsuspecting attack victim (e.g., a website). This unsolicited response volume can effectively flood the victim and impact their ability to use online resources. After detecting or receiving a notification of an attack, the attack can be mitigated by changing, at registry 110, the DNS delegation information or network information for the resource being queried so that attack traffic can be filtered away from the attack victim. For example, the IP address of a website under attack could be changed in the zone by non-registrar service provider 140 (e.g., a DNS hosting provider) by coordinating with the SRS. Accordingly, if registry 110 provided an interface between the non-registrar service provider 140 and registry 110 that allowed non-registrar service provider 140 to make the required changes, non-registrar service provider 140 would be able to provide the DDoS mitigation services.

Alternatively, in some embodiments, registry 110 can provide limited and controlled access to the SRS to allow non-registrar service provider 140 a subset of existing domain management functions available using the SRS. For example, registry 110 can allow registrar 120 to sponsor service providers (e.g. non-registrar service provider 140) to perform actions on their behalf. Accordingly, sponsored non-registrar service provider 140 could provide services without having to go through registrar 120 to access the SRS. Sponsored service providers would reduce latency and/or inefficiency by being able to directly access the SRS, without having to communicate through registrar 110, and would be able to provide supplemental services to registrant 130 that registrar 120 does not provide.

In some embodiments, authorization service 150 can be a service that maintains authorization information. For example, authorization information can be stored at the authorization service 150 and/or in a separate archive (not pictured) that can be a database or other type of storage device for storing authorization information. Authorization information that is maintained by authorization service 150 can be associated with a registrant and/or a domain name. For example, authorization information can be created by registry 110 or authorization service 150 in response to a domain name registration. In some embodiments, authorization information can include, for example, a user name and/or password generated by registrant 130 (e.g. by a user at registrant 130). In further embodiments, authorization information can include, for example, an alphanumeric key generated by registry 110 or authorization service 150. If the authorization information is generated by authorization service 150, it can be stored in the archive and associated with a domain name and/or registrant. Otherwise, the authorization information can be received from registry 110, and then stored in the archive and associated with a domain name and/or registrant. Authorization service 150 can subsequently receive requests from registry 110 to validate requests from non-registrar service providers (e.g. non-registrar service provider 140), as discussed in further detail below.

In some implementations, authorization service 150 or registry 110 can generate a random alphanumeric key for each domain name that is registered. In further implementations, authorization service 150 or registry 110 can generate multiple random alphanumeric keys for each domain name, where each key is associated with a specific service. For example, DNS hosting for a domain name can be associated with a first key, and DNSSEC services can be associated with a second key. In still further embodiments, a key can be deleted after it is used once, and a new key can be generated and transferred to registrant 130, registrar 120, and/or non-registrar service provider 140.

For example, a key associated with a specific service can be provided to registrant 130 via registrar 120, and registrant 130 can provide the key to non-registrar service provider 140. Non-registrar service provider 140 can use a key associated with a specific service to receive authorization to access the SRS to perform the specific service. Once the key is used, registry 110 can generate a new key for the specific service and provide the new key to non-registrar service provider 140 and not provide the key to registrar 120.

In some embodiments, authorization service 150 can be a service that is separate from registry 110, while in further embodiments, authorization service 150 can be integrated with and/or a part of registry 110.

The schematic depicted in FIG. 1 is merely for the purpose of illustration and is not intended to be limiting. For example, additional registries, registrars, registrants, and service providers may be used as part of a DNS. Further, the DNS structure depicted is merely a simplified example of a DNS, consistent with certain disclosed embodiments, but such an example is not intended to be limiting.

Figure 2:
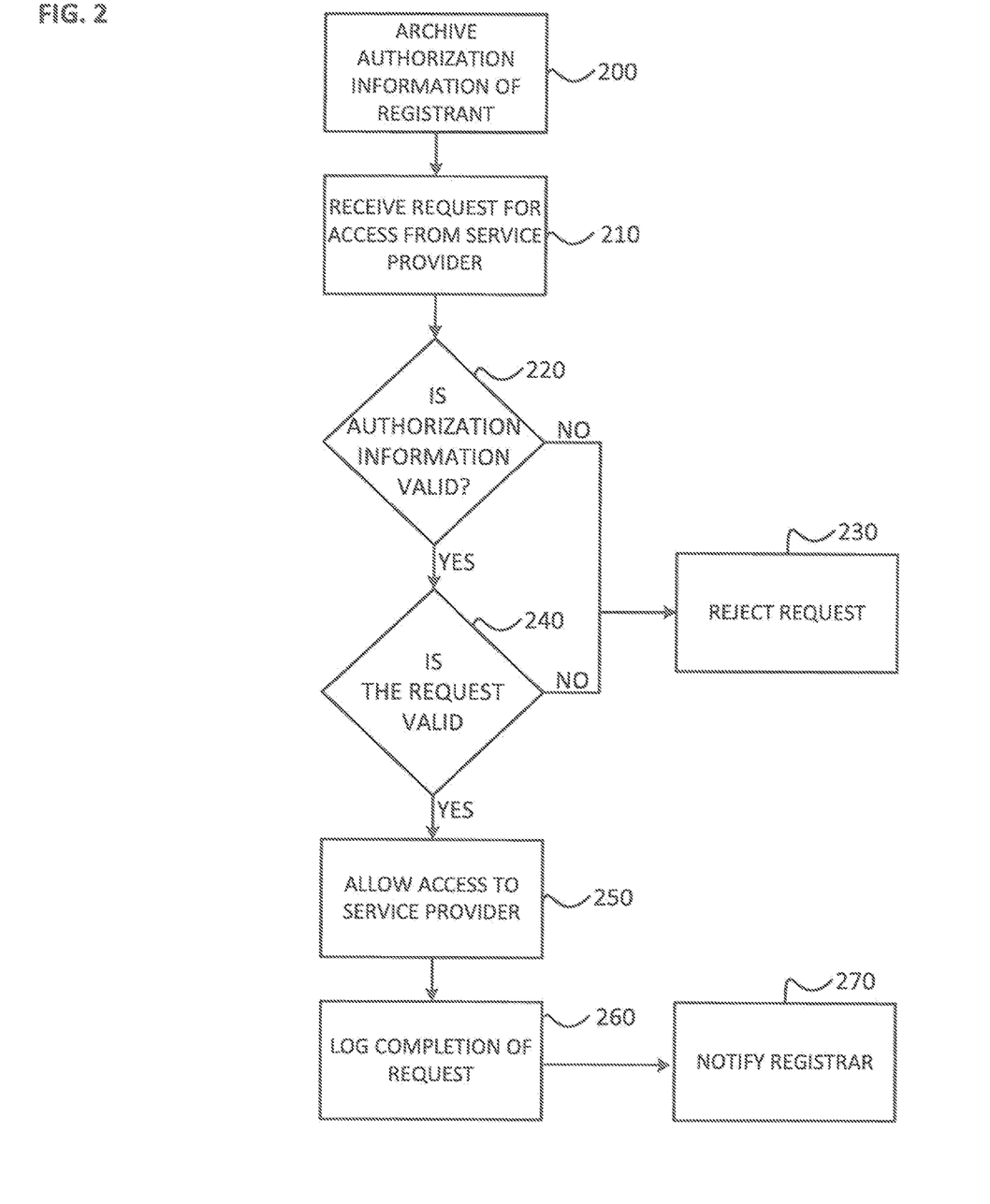
FIG. 2 is a flow diagram illustrating an example method performed by a registry to allow a non-registrar service provider to access functionality of an SRS, consistent with certain disclosed embodiments.

FIG. 2 is a flow diagram illustrating an example method performed by a registry to allow a non-registrar service provider to access functionality of an SRS, consistent with certain disclosed embodiments. The method can be performed, for example, by registry 110 in FIG. 1. Accordingly, for the purposes of example, reference is made to the entities depicted in FIG. 1.

The process can begin in 200, when registry 110 stores authorization information associated with a registrant 130 in an archive. In some embodiments, authorization information can include, for example, a user name, a password, an alphanumeric key, etc. In some implementations, the archive can be maintained by a separate authorization service.

In some embodiments, the authorization information can be created as part of a domain name registration process. For example, registrant 130 can reserve a new domain name through registrar 120, which is authorized by registry 110. Registrar 120 can reserve the new domain name by accessing the SRS of registry 110 using the Extensible Provisioning Protocol (EPP) to use domain creation functions of the SRS of registry 110. In response to the reservation, authorization information can be created, for example, by registry 110, registrant 130, registrar 120, or authorization service 150. All or part of the authorization information can be archived by registry 110 (e.g. the user name and password, the alphanumeric key, etc.). Additionally, all or part of the authorization information can be communicated to and/or stored by registrar 120 and/or registrant 130.

In other embodiments, the authorization information can be created based on a request for a specific service. For example, registrant 130 can transmit a request to registry 110 (e.g., via registrar 120) for authorization information to allow non-registrar service provider 140 to provide a specified service. Registry 110 can subsequently generate and/or store authorization information that is associated with the specified service. The authorization information can be communicated to and/or stored by registrar 120 and/or registrant 130. In such embodiments, registry can archive unique authorization information for each different service associated with the same domain name.

In some implementations, registrar 120, registrant 130, or both can request specified levels of access for non-registrar service providers that are authorized to access the SRS. For example, as part of the reserving the domain name, registrant 130 can indicate that it wants to allow non-registrar service providers to have access to functionality of the SRS for the domain name. Registrant 130 can specify that it wants to allow authorized non-registrar service providers the ability to, for example, publish DNS Name Server (NS) records and Delegation Signer (DS) records but not the ability to update other domain data or create, delete, or renew domain data.

As an additional example registrar 120 can indicate that it wants to allow sponsorship of non-registrar service providers, so that sponsored non-registrar service providers have access to functionality of the SRS. Registrar 120 can specify that it wants to allow all sponsored non-registrar service providers the ability to, for example, publish DNS Name Server (NS) records and Delegation Signer (DS) records but not the ability to update other domain data or create, delete, or renew domain data In some embodiments, registrant 130 may desire to utilize non-registrar service provider 140 that has not been previous authorized by registry 110. For example, non-registrar service provider 140 may provide web site hosting, DNS hosting, DNSSEC services, DDOS mitigation services, etc. In order to utilize the services of non-registrar service provider 140, registrant 130 can provide the authorization information to non-registrar service provider 140. In some embodiments, non-registrar service provider 140 can request the authorization information from a previous service provider. For example, a previous service provider can outsource a particular service to non-registrar service provider 140 and the previous service provider can provide the authorization information to new non-registrar service provider 140.

Subsequently, in 210, non-registrar service provider 140 can request access to the SRS of registry 110 using the authorization information. For example, non-registrar service provider 140 can request access by requesting a resource associated with registrant 130 via the SRS of registry 110 using the authorization information provided by registrant 130. In some embodiments, the level of access allowed to a non-registrar service provider can be based on the particular service that is requesting authorization. For example, a DNS hosting provider would use the authorization information to become the assigned DNS hosting provider for the domain name. Accordingly, a DNS hosting provider can be given privileges to set the NS and the DS for a domain name. As an additional example, a DDoS service provider can be given privileges to request DNS based filtering by the assigned DNS hosting provider for a domain name. As a further example, an email forwarding provider can be given privileges to add MX records to a domain name zone. As a still further example, a domain resale provider can be given privileges to list a domain name for resale and initiate transfer of the domain name in registry 110.

In some embodiments, non-registrar service provider 140 can communicate with registry 110 using a web service, such as, for example, a web service that uses the principles of Representational State Transfer (REST), hereinafter referred to as a RESTful web service. The RESTful web service can use Hypertext Transfer Protocol (HTTP) and resources available via the SRS of the registry can be identified using Uniform Resource Locators (URLs). In some embodiments, the web service can publish URLs to perform specific actions. For example, the URLs can be published in registry documentation for service providers. As a further example, registry 110 can provide a discover service built to list the URLs for service providers. In some implementations, the web service can connect to the registry to make a request, while, in further implementations, the registry can also send requests via the web service. In some embodiments, URLs of the web service can be published by registry 110 so that non-registrar service provider 140 can retrieve and utilize the URLs.

Non-registrar service provider 140 can request a resource by attempting to access a URL, provided by registrant 130, using an HTTP user agent. The HTTP user agent then starts an HTTP transaction with registry 110 to access the resource.

In 220, registry 110 can determine if the received authorization information is valid. For example, registry 110 can contact an authorization service to validate the authorization information received from non-registrar service provider 140. In some embodiments, registry 110 can transmit the authorization information to the authorization service that has previously stored the authorization information. In other embodiments, registry 110 can retrieve the archived authorization information and transmit the archived authorization information and the received authorization information to the authorization service. In further embodiments, the authorization can be performed by registry 110.

In some embodiments, the authorization information can be authorized by comparing the received authorization information with stored authorization information associated with a specified domain name and/or a specified service.

In some implementations, the authorization information can also include an identification of non-registrar service provider 140. Accordingly, registry 110 and/or the authorization service can additionally authenticate the identity of non-registrar service provider 140.

If the result of the authorization is NO (e.g., the authorization service or registry 110 did not authenticate the authorization information) the process can proceed to 230 where registry 110 rejects the request. For example, the authorization information can include an alphanumeric key that does not match the archived key. Accordingly, an attempt to validate the key would fail, and the request would be rejected.

In some embodiments, the request can be rejected in 230 by sending a notification to non-registrar service provider 140 that the authorization information was invalid and/or sending a notification to registrant 130 and/or registrar 120 notifying them that an attempt was made to access registry information of the registrant. In other embodiments, the request can be rejected in 230 by logging a failed request at registry 110. In still further embodiments, the request can be rejected in 230 by performing no further actions.

If the result of the authorization is YES (e.g., the authorization service or registry 110 authenticated the authorization information) the process can proceed to 240 where registry 110 determines if the request is valid. For example, the authorization information can include can include an alphanumeric key that does match the archived key. Accordingly, an attempt to validate the certificate using the public key would succeed, and the process would continue. In some embodiments, once a non-registrar hosting provider provides valid authorization information, the non-registrar hosting provider can be designated as the assigned non-registrar hosting provider for the service that the non-registrar hosting provider is requesting access.

In 240, registry 110 can determine if the request is valid. In some embodiments, registry 110 can allow limited access to the SRS. For example, registry 110 can allow management functions performed by entities that are not authorized registrars to be limited to creation, modification, and deletion of operation information. Accordingly, with such access, non-registrar service provider 140 can publish DNS Name Server (NS) records, Address (A, AAAA) records, Delegation Signer (DS) records, Canonical Name (CNAME) records, and Mail Exchange (MX) records. In further embodiments, registry 110 may further limit access to the SRS based on levels of access requested by registrant 130 and/or registrar 120. For example, registrar 120 and/or registrant 130 may request that only specified functions be allowed to non-registrar service provider 140, and registry 110 can further limit access to the SRS accordingly. In still further embodiments, registrar 120 and/or registrant 130 may request that no access to the SRS be allowed to non-registrar service provider 140. In still further embodiments, the level of access allowed to non-registrar service provider 140 can be based on the particular service that non-registrar servicer provider 140 is requesting authorization.

Based on the level of access to the SRS, registry 110 can determine if the request is valid. In other words, registry 110 can determine if the request utilizes an authorized function of the SRS. If the request is not valid (e.g., attempts an unauthorized or non-existent function) the process can proceed to 230 where registry 110 rejects the request.

If the request is valid (e.g., attempts an authorized function), the process can proceed to 250.

In some embodiments, registry 110 can transmit, to registrar 120, a request to specify a level of access associated with the domain name in response to receiving the request for access. For example, if registrar 120 has not previously indicated a level of access to the SRS allowed for non-registrar service providers that it sponsors, registry 110 can transmit the request. Accordingly, in such embodiments, registry 110 can determine if the request is valid based on a response from the registrar that includes the specified level of access for the domain name.

In 250, registry 110 can allow access to the SRS by, for example, allowing the requested function to be performed via the SRS. In some embodiments, registry 110 can publish NS records, A or AAAA records, DS records, CNAME records, and/or MX records in response to the request from non-registrar service provider 140.

In 260, in some embodiments, registry 110 can log information associated with the completion of the requested function. Registry 110 can, in some implementations, maintain a log of requests by service providers. In such implementations, registry 110 can monitor the log to ensure service providers are not engaging in malicious behavior. In some embodiments, if such behavior is detected, registry 110 can blacklist the service provider at issue and may not allow future access to the SRS to the blacklisted service provider.

As an example, a log entry in the log of requests can include an indicator of the functions and/or resources that were associated with the request and an identifier of the service provider that made the request.

In 270, in some embodiments, registry 110 can notify registrar 120 (the sponsoring registrar) that the requested function took place. In some implementations, registrar 120 can maintain a log of requests by sponsored service providers. In such implementations, registrar 120 can monitor the log to ensure service providers are not engaging in malicious behavior. In some embodiments, if such behavior is detected, registrar 120 can blacklist the service provider at issue and may not sponsor the blacklisted service provider for future functions.

While the steps depicted in FIG. 2 have been described as performed in a particular order, the order described is merely an example, and various different sequences of steps can be performed, consistent with certain disclosed embodiments. For example, 220 and 240 can be performed in reverse order or can be performed simultaneously. As an additional example, 250, 260, and 270 can be performed in the order described, in reverse order, simultaneously, or in any other order. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 3:
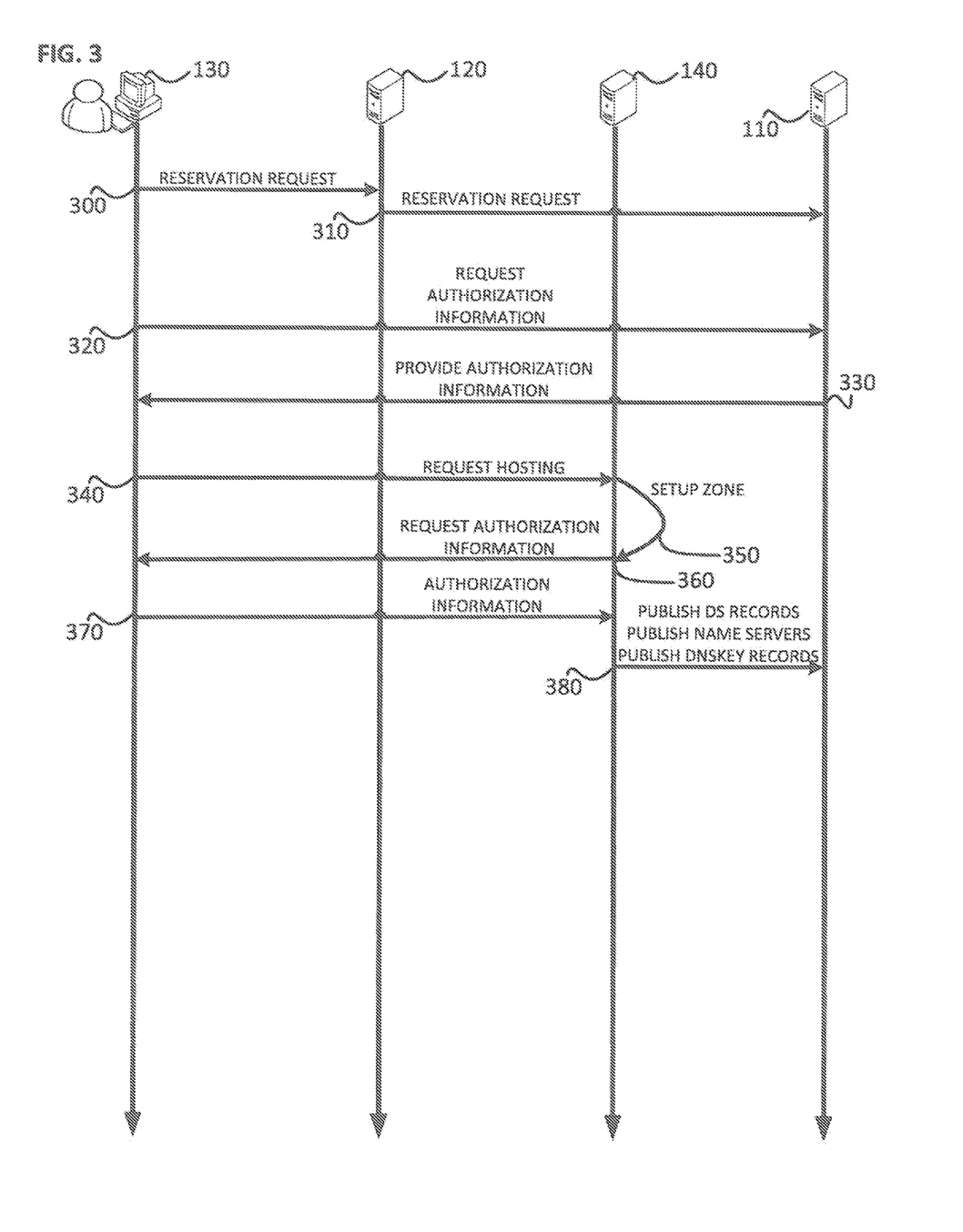
FIG. 3 is an illustration of an example process performed by a registry, a registrar, a registrant, and a service provider that acquires access to an SRS of the registry, consistent with certain disclosed embodiments.

FIG. 3 is an illustration of an example process performed by a registry, a registrar, a registrant, and a service provider that acquires access to an SRS of the registry, consistent with certain disclosed embodiments. The example process can be performed by registry 110, registrar 120, registrant 130, and non-registrar service provider 140 in FIG. 1. Accordingly, for the purposes of example, reference is made to the entities depicted in FIG. 1.

In 300, registrant 130 can request reservation of a domain name (e.g., www.example.com) by a request sent to registrar 120. In 310, registrar 120 can access the SRS of registry 110 using EPP to reserve the domain name for registrant 130.

In 320, registrant 130 can request the authorization information associated with the domain name from registry 110. For example, registrant 130 can request the authorization information via registrar 120 or via an existing service provider (e.g., a non-registrar service provider), and registrar 120 or the existing service provider can request the authorization information from registry 110 and/or provide the authorization information to registrant 130. Registrant 130 can use the authorization information to allow service providers access to the SRS for functions associated with the domain name. In 330, registry 110 can provide the authorization information to registrant 130.

Registrant 130 may desire to obtain DNS hosting services provided by non-registrar service provider 140. For example, registrant 130 may elect to use non-registrar service provider 140 because non-registrar service provider 140 provides DNSSEC services.

In 340, registrant 130 can contact non-registrar service provider 140 to request DNS hosting. In some embodiments, the request can include an indication of the domain name that registrant 130 requests to have hosted, verification information to verify that registrant 130 is the owner of the domain name, and/or the authorization information that confirms that registrant 130 has authorized non-registrar service provider 140 to provide DNS hosting services for the domain name.

In 350, non-registrar service provider 140 can setup a DNSSEC enabled zone for the domain name. In some embodiments, non-registrar service provider 140 may not publicly publish the zone until all required records are set up at registry 110. Non-registrar service provider 140 can additionally create DNSKEY records in the DNSSEC enabled zone for a key-signing key (KSK) and a zone-signing key (ZSK).

In 360, non-registrar service provider 140 can request the authorization information for the domain name from registrant 130. Then, in 370, registrant 130 can provide the authorization information to non-registrar service provider 140.

In 380, non-registrar service provider 140 can request access to the SRS of registry 110 using, for example, a RESTful web service provided by registry 130 for sponsored service providers. Non-registrar service provider 140 can transmit the authorization information received from registrant 130, and, after validating the authorization information, registry 110 can allow non-registrar service provider 140 to access the SRS.

Using the SRS, non-registrar service provider 140 can publish a DS record at registry 110 for the created ZSK and publish one or more name servers of non-registrar service provider 140 for the domain name.

While the steps depicted in FIG. 3 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 4:
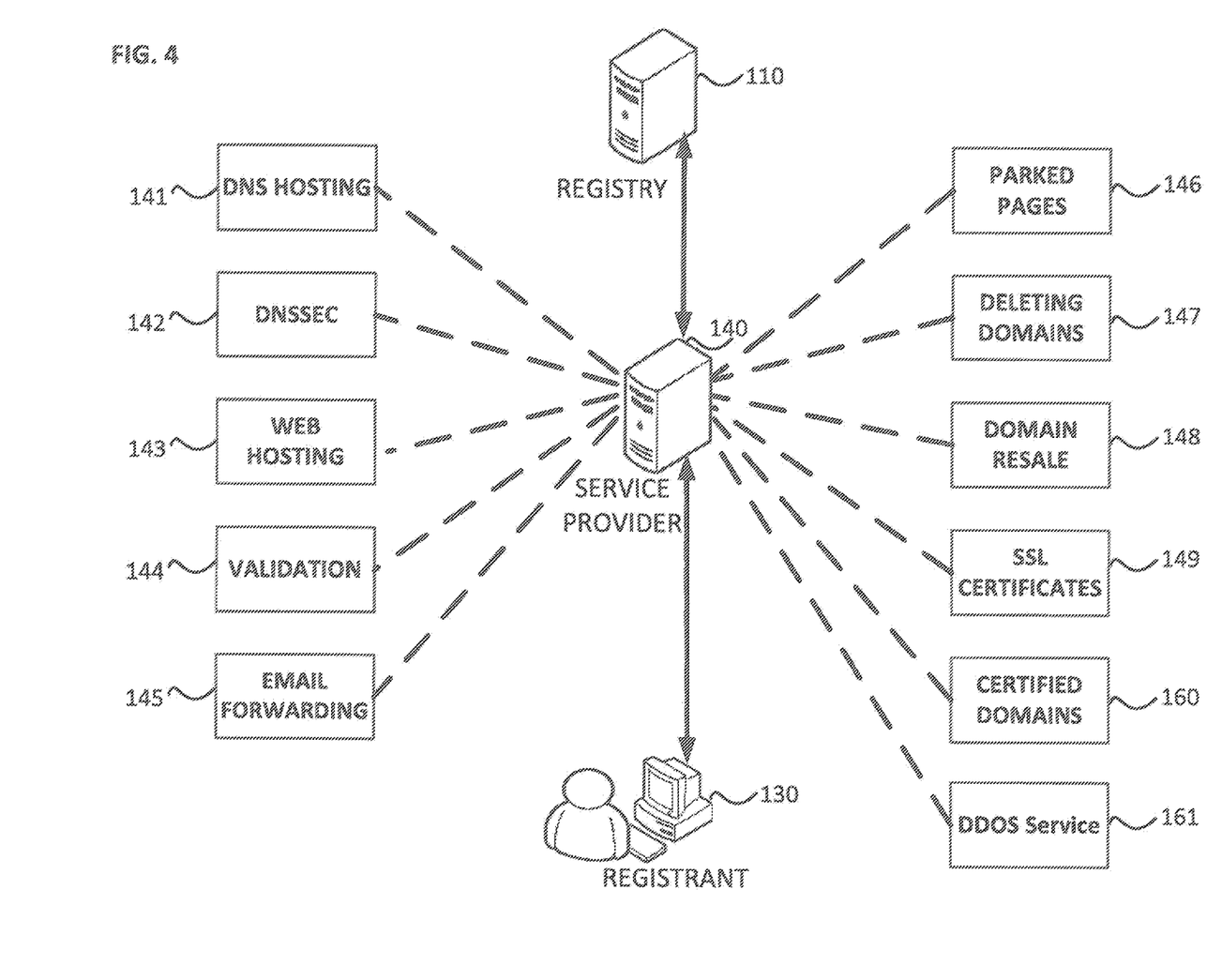
FIG. 4 is a diagram depicting examples of services provided by a non-registrar service provider, consistent with certain disclosed embodiments.

FIG. 4 is a diagram depicting examples of services provided by a non-registrar service provider, consistent with certain disclosed embodiments. In particular, FIG. 4 depicts registry 110, registrant 130, and non-registrar service provider 140, as discussed above with regard to FIG. 1.

Service 141 can represent a DNS hosting service provided by non-registrar service provider 140. In some embodiments, registrant 130 can provide authorization information associated with a domain name to non-registrar service provider 140 so that non-registrar service provider can access the SRS of registry 110 to provide DNS hosting services. In other embodiments, a registrar (e.g., registrar 120 in FIG. 1) can provide authorization information associated with a domain name (or multiple sets of authorization information associated with multiple domain names) to outsource DNS hosting services to non-registrar service provider 140.

In some implementations, the DNS hosting service can be a thin DNS hosting service. Using the provided authorization information, non-registrar service provider 140 can interface directly with registry 110. Registry 110 can allow non-registrar service providers to make changes to the domain name data on a per domain basis in the SRS. Accordingly, when the authorization information associated with a domain name is received and validated, registry 110 can allow non-registrar service provider 140 to make changes to the domain name data for the domain name in the SRS. The domain name data that is relevant to non-registrar service provider 140 for providing DNS hosting services can include the DNSSEC (DS or DNSKEY) data, the name servers (NS), and the Time To Live (TTL). By allowing non-registrar service provider 140 to directly connect to registry 110 to manage DNS related attributes, DNSSEC and enhanced DNS functions can be fully automated without having to directly involve registrant 130 or a registrar.

In some implementations, the DNS hosting service can be a thick DNS hosting service. In such implementations, DNS hosting services provided by non-registrar service provider 140 can be provided to registrant 130 without registrant 130 having to directly interface with the non-registrar service provider 140. Instead, registrar 110 can provide a list of available DNS hosting providers to registrant 140. Once a DNS hosting provider is selected (e.g., non-registrar service provider 140), registrant 130 can make DNS changes using the registrar (e.g., registrar 120 in FIG. 1), and the changes can be sent from the registrar to registry 110, and from registry 110 to non-registrar service provider 140. Registrant 130 can make DNS changes and/or select features via the registrar (which pass through registry 110 to non-registrar service provider 140), such as enabling enhanced availability features, enabling/disabling DNSSEC, and using DNS zone level management features.

In some embodiments, registry 110 can define non-registrar service provider 140 to be primary and/or the only authorized provider, and registry 110 can automatically authorize and notify non-registrar service provider 140 on a domain create. In further embodiments, registry 110 can further provide support features, such as transferring a DNS hosting provider with or without a DNSSEC transfer.

Service 142 can represent a DNSSEC service provided by non-registrar service provider 140. In some embodiments, non-registrar service providers of DNSSEC services (e.g., non-registrar service provider 140) can be registered with registry 110 for selection by the registrant or registrar. For example, registrant 130 can provide authorization information associated with a domain name to non-registrar service provider 140 so that non-registrar service provider 140 can register with registry 110 to provide DNSSEC services. Accordingly, non-registrar service provider 140 can be authorized to manage the DNSSEC attributes (DNSKEY or DS) via the SRS of registry 110 on, for example, a per domain basis.

Service 143 can represent a website hosting service provided by non-registrar service provider 140. In some embodiments, registrant 130 can provide authorization information associated with a domain name to non-registrar service provider 140 so that non-registrar service provider can access the SRS of registry 110 to provide website hosting services. In other embodiments, a registrar (e.g., registrar 120 in FIG. 1) can provide authorization information associated with a domain name (or multiple sets of authorization information associated with multiple domain names) to outsource website hosting services to non-registrar service provider 140.

In some implementations, after validating the authorization information provided by non-registrar service provider 140, non-registrar service provider 140 can be authorized to set IP addresses and other DNS properties (e.g. CNAME) for a domain name via the SRS. Website hosting services are often coupled with the registrar business, and utilizing a non-registrar service provider 140 as a website hosting provider can require obtaining website hosting details from a registrar associated with the domain name. Accordingly, certain website hosting details required by non-registrar service provider 140 to provide the website hosting services can be passed from a registrar (e.g. registrar 120 in FIG. 1), through registry 110, to non-registrar service provider 140. The website hosting details can include features of the website and/or website preferences, such as the website hosting template to use.

Service 144 can represent a validation service provided by non-registrar service provider 140. In some embodiments, registrant 130 can provide authorization information associated with a domain name to non-registrar service provider 140 so that non-registrar service provider can provide validation services. In other embodiments, a registrar (e.g., registrar 120 in FIG. 1) can provide authorization information associated with a domain name (or multiple sets of authorization information associated with multiple domain names) to outsource validation services to non-registrar service provider 140.

In some implementations, a validation service can be a service that is used by multiple DNS services, such as, for example, TLS certificate services, and certified domain services. Example validation services that can be provided by non-registrar service provider 140 include contact validation, website malware scanning, compliance validation, extended validation, etc. In some embodiments, validation services can require access to the SRS of registry 110 to perform validation services associated with the domain name.

Service 145 can represent an email forwarding service provided by non-registrar service provider 140. In some embodiments, registrant 130 can provide authorization information associated with a domain name to non-registrar service provider 140 so that non-registrar service provider can access the SRS of registry 110 to provide email forwarding services. In other embodiments, a registrar (e.g., registrar 120 in FIG. 1) can provide authorization information associated with a domain name (or multiple sets of authorization information associated with multiple domain names) to outsource email forwarding services to non-registrar service provider 140.

In some implementations, upon authorization, registrar 110 can permit non-registrar service provider 140 to set mail exchange (MX) records associated with the domain name via the SRS. The MX records specify how email associated with a domain name is forwarded. Accordingly, once authorized, non-registrar service provider 140 can provide services, such as, for example, setting up different email forwarding routes for different sub-domains of the domain name.

Service 146 can represent a parked page service provided by non-registrar service provider 140. In some embodiments, registrant 130 can provide authorization information associated with a domain name to non-registrar service provider 140 so that non-registrar service provider can access the SRS of registry 110 to provide parked page services. In other embodiments, a registrar (e.g., registrar 120 in FIG. 1) can provide authorization information associated with a domain name (or multiple sets of authorization information associated with multiple domain names) to outsource parked page services to non-registrar service provider 140.

Parked page services can refer to an advertising practice that is also known as "parked domain monetization," where a domain name is registered without being associated with any services, such as e-mail or a website. While the domain name is parked it can resolve to a web page containing advertising listings and links, allowing the registrant to receive revenue prior to setting up services associated with the domain name.

In some implementations, non-registrar service provider 140 can be a parked page provider that provides services to registrants and to registrars through registry 110. Once the authorization information is validated, non-registrar service provider 140 can be given authorization to change the name servers of the domain name, via the SRS, to set up the parked pages.

In some embodiments, registrant can select from a set of supported parked page providers (e.g., including non-registrar service provider 140) that can be automatically set and changed later through a registrar that outsources the parked page service (e.g., registrar 120 in FIG. 1).

Service 147 can represent a deleting domain service provided by non-registrar service provider 140. In some implementations, a deleting domains service can represent a service of handling expiring domain names and distributing the expired domain names to registrars. In some embodiments, non-registrar service provider 140 can receive authorization to provide deleting domains services directly from registry 110, while, in further embodiments, non-registrar service provider 140 can represent a service that is a part of registry 110.

Non-registrar service provider 140 can be tasked with making deleting domain services as fair and impartial as possible. For example, non-registrar service provider 140 can utilize metrics provided by registry 110 via the SRS, use a Wait List Service (WLS), and/or use a Listing Service (CLS) to distribute expired domain names. In some embodiments, registry 110 can automate the transfer of the domain name to a winning registrar.

Service 148 can represent a domain resale service provided by non-registrar service provider 140. In some embodiments, a registrar (e.g., registrar 120 in FIG. 1) can provide authorization information associated with a domain name (or multiple sets of authorization information associated with multiple domain names) to outsource domain resale services to non-registrar service provider 140.

In some implementations, non-registrar service provider 140 can access domain records of registry 110 via the SRS to, for example, appraise domain names, add domain names for resale, list domain names for resale to support query and check services provided by registry 110, hold domain resale auctions, purchase domain names for resale, transfer domain names, etc. Non-registrar service provider 140 can separately provide advertisements visible during the resale process and can directly interact with registrant 130 to allow for the purchase and transfer of a domain name.

Service 149 can represent a TLS certificate service provided by non-registrar service provider 140. In some embodiments, a registrar (e.g., registrar 120 in FIG. 1) can provide authorization information associated with a domain name (or multiple sets of authorization information associated with multiple domain names) to outsource TLS certificate services to non-registrar service provider 140. In other embodiments, registrant 130 can provide authorization information associated with a domain name to non-registrar service provider 140.

In some embodiments, non-registrar service provider 140 can be a certificate authority that allows registrants (e.g., registrant 130) to purchase certificates for validation, including, for example, Domain Validation (DV) certificates and Extended Validation (EV) certificates.

Upon authorization, non-registrar service provider 140 can be registered as a certificate authority with registry 110.

In some embodiments, a registrar (e.g., registrar 120 in FIG. 1) can provide a list of available TLS certificate providers to registrant 130 and can automate the process of creating a DV TLS Certificate and/or can manage the EV TLS Certificate verification process. Registry 110 can provide an application programming interface (API) to non-registrar service provider 140 to enable the sale of the TLS Certificates to registrars (e.g., registrar 120 in FIG. 1) and their registrants (e.g., registrant 130).

Service 160 can represent a certified domain service provided by non-registrar service provider 140. In some embodiments, registrant 130 can provide authorization information associated with a domain name to non-registrar service provider 140 so that non-registrar service provider can access the SRS of registry 110 to provide certified domain services. In other embodiments, a registrar (e.g., registrar 120 in FIG. 1) can provide authorization information associated with a domain name (or multiple sets of authorization information associated with multiple domain names) to outsource certified domain services to non-registrar service provider 140.

In some embodiments, once authorized, non-registrar service provider 140 can certify various information that would provide assurances that a website is legitimate, such as, for example, registrant contact information. For example, non-registrar service provider 140 can add relevant entries into a registration data query service (such as WHOIS or the Registration Data Access Protocol (RDAP)) for the domain name and/or provide for the inclusion of a seal on the website to indicate that the website is certified.

In further embodiments, once authorized, non-registrar service provider 140 can received indications of changes to domain data from registry 110 (e.g., via the SRS), which can trigger re-certification. For example, data gathered by registry 110 (e.g., Internet Provider Security (IPS) tags, domain history data, and non-existent domain (NXD) data) could be transmitted to non-registrar service provider 140, and non-registrar service provider 140 can identify trends, risks, and threats based on the data. If a particular trend, risk, and/or threat is identified, re-certification can be triggered.

Service 161 can represent a DDoS service provided by non-registrar service provider 140. In some embodiments, registrant 130 can provide authorization information associated with a domain name to non-registrar service provider 140 so that non-registrar service provider can access the SRS of registry 110 to provide DDoS services.

In some embodiments, once authorized, non-registrar service provider 140 can request DNS based filtering and/or network filtering by the assigned DNS hosting provider for a domain name. For example, non-registrar service provider 140 can change the IP address of a website under a DDoS attack in the zone.

The example services depicted in FIG. 4 are merely for the purpose of illustration and are not intended to be limiting. For example, additional services may be provided by non-registrar servicer provider 140 and/or registry 110, consistent with disclosed embodiments.

Figure 5:
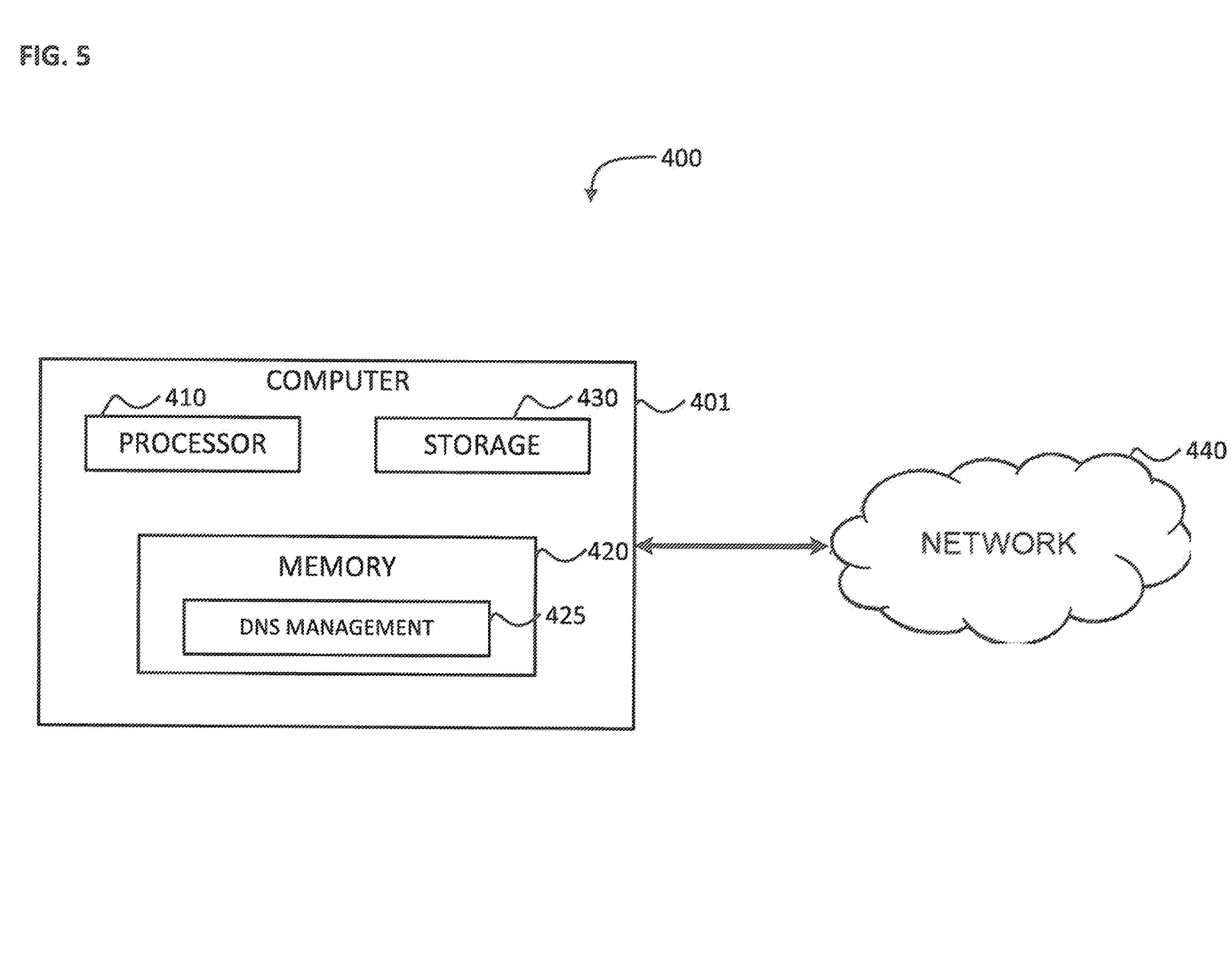
FIG. 5 is a diagram illustrating an example of a hardware system for managing DNS, consistent with certain disclosed embodiments.

FIG. 5 is a diagram illustrating an example of a hardware system 400 for managing DNS, consistent with certain disclosed embodiments. The example system 400 includes example system components that may be used. The components and arrangement, however, may be varied.

A computer 401 may include a processor 410, a memory 420, storage 430, and input/output (I/O) devices (not pictured). The computer 401 may be implemented in various ways and can be configured to perform any of the embodiments described above. For example, the computer 601 may be a general purpose computer configured to perform embodiments described above. In some embodiments, computer 401 can represent registrant 130 and can be a general purpose computer of an end user that can request reservations of domain names and services provided by DNS service providers. As an additional example, the computer 401 can be a specialized computer system specifically designed to perform DNS management functions, including embodiments described above. In some embodiments, computer 401 can represent registry 110, registrar 120, or non-registrar service provider 140 and can be a computer system specifically designed to perform the functions of the respective service, as described above. The computer 401 may be standalone or may be part of a subsystem, which may, in turn, be part of a larger system.

The processor 410 may include one or more known processing devices, such as a microprocessor from the Intel Core™ family manufactured by Intel™, the Phenom™ family manufactured by AMD™, or the like. Memory 420 may include one or more storage devices configured to store information and/or instructions used by processor 410 to perform certain functions and operations related to the disclosed embodiments. Storage 430 may include a volatile or non-volatile, magnetic, semiconductor, tape, optical, removable, non-removable, or other type of computer-readable medium used as a storage device. In some embodiments, storage 430 can, for example, store DNS NS records, A and/or AAAA records, DS records, CNAME records, MX records, authorization information, etc.

In an embodiment, memory 420 may include one or more programs or subprograms including instructions that may be loaded from storage 430 or elsewhere that, when executed by computer 401, perform various procedures, operations, or processes consistent with disclosed embodiments. For example, memory 420 may include a DNS management program 425 for providing an SRS, publishing records, generating and validating authorization information, providing a RESTful web service, setting up TLD zones, setting up child zones, etc., according to various disclosed embodiments. Memory 420 may also include other programs that perform other functions, operations, and processes, such as programs that provide communication support, Internet access, etc. The DNS management program 425 may be embodied as a single program, or alternatively, may include multiple sub-programs that, when executed, operate together to perform the function of the DNS management program 625 according to disclosed embodiments. In some embodiments, DNS management program can perform all or part of the processes of FIGS. 2 and 3, described above.

The computer 401 may communicate over a link with a network 440. For example, the link may be a direct communication link, a local area network (LAN), a wide area network (WAN), or other suitable connection. The network 440 may include the internet, as well as other networks, which may be connected to various systems and devices.

The computer 401 may include one or more input/output (I/O) devices (not pictured) that allow data to be received and/or transmitted by the computer 401. I/O devices may also include one or more digital and/or analog communication I/O devices that allow the computer 401 to communicate with other machines and devices. I/O devices may also include input devices such as a keyboard or a mouse, and may include output devices such as a display or a printer. The computer 401 may receive data from external machines and devices and output data to external machines and devices via I/O devices. The configuration and number of input and/or output devices incorporated in I/O devices may vary as appropriate for various embodiments.

Example uses of the system 400 can be described by way of example with reference to the example embodiments described above.

While the teachings has been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A computer-implemented method, comprising:
   receiving, at a registry, a request for access to a domain management function, wherein the request includes authorization information to allow a non-registrar service provider to provide a specified service for a domain name;
   determining whether the authorization information is valid based on the authorization information and an electronically stored authorization information associated with the domain name; and
   allowing the non-registrar service provider access to the domain management function based on a determination that the authorization information is valid, wherein the domain management function is based on the specified service, wherein the registry is a domain name registry configured to publish zone information used to resolve a domain name query.

2. The computer-implemented method of claim 1, wherein the request for access to the domain management function comprises a request for access to a shared registration system (SRS) of the domain name registry.

3. The computer-implemented method of claim 1, wherein access to the domain management function is through an Extensible Provisioning Protocol (EPP).

4. The computer-implemented method of claim 1, wherein the request originates from the non-registrar service provider.

5. The computer-implemented method of claim 1, wherein the request originates from a registrant of the domain name.

6. The computer-implemented method of claim 1, wherein the authorization information is unique to the specified service.

7. The computer-implemented method of claim 1, wherein the specified service includes publishing Domain Name System (DNS) records and does not include updating domain name data, creating domain data, deleting domain data, and renewing domain data.

8. A computer server system comprising:
   a processing system of a device comprising one or more processors; and
   a memory system comprising one or more computer-readable media, wherein the one or more computer-readable media contain instructions that, when executed by the processing system, cause the processing system to perform operations comprising:
   receiving, at a registry, a request for access to a domain management function, wherein the request includes authorization information to allow a non-registrar service provider to provide a specified service for a domain name;
   determining whether the authorization information is valid based on the authorization information and an electronically stored authorization information associated with the domain name; and
   allowing the non-registrar service provider access to the domain management function based on a determination that the authorization information is valid, wherein the domain management function is based on the specified service,
   wherein the registry is a domain name registry configured to publish zone information used to resolve a domain name query.

9. The computer server system of claim 8, wherein the request for access to the domain management function is a request for access to a shared registration system (SRS) of the domain name registry.

10. The computer server system of claim 8, wherein access to the domain management function is through an Extensible Provisioning Protocol (EPP).

11. The computer server system of claim 8, wherein the request originates from the non-registrar service provider.

12. The computer server system of claim 8, wherein the request originates from a registrant of the domain name.

13. The computer server system of claim 8, wherein the authorization information is unique to the specified service.

14. The computer server system of claim 8, wherein the specified service includes publishing Domain Name System (DNS) records and does not include updating domain name data, creating domain data, deleting domain data, and renewing domain data.

15. A non-transitory computer readable storage medium comprising instructions for causing one or more processors of at least one server computer to:
   receive, at a registry, a request for access to a domain management function, wherein the request includes authorization information to allow a non-registrar service provider to provide a specified service for a domain name;
   determine whether the authorization information is valid based on the authorization information and an electronically stored authorization information associated with the domain name; and
   allow the non-registrar service provider access to the domain management function based on a determination that the authorization information is valid, wherein the domain management function is based on the specified service,
   wherein the registry is a domain name registry configured to publish zone information used to resolve a domain name query.

16. The non-transitory computer readable storage medium of claim 15, wherein the request for access to the domain management function is a request for access to a shared registration system (SRS) of the domain name registry.

17. The non-transitory computer readable storage medium of claim 15, wherein access to the domain management function is through an Extensible Provisioning Protocol (EPP).

18. The non-transitory computer readable storage medium of claim 15, wherein the request originates from the non-registrar service provider.

19. The non-transitory computer readable storage medium of claim 15, wherein the request originates from a registrant of the domain name.

20. The non-transitory computer readable storage medium of claim 15, wherein the authorization information is unique to the specified service.

* * * * *